United States Patent [19]

Iwai et al.

[11] Patent Number: 4,820,029
[45] Date of Patent: Apr. 11, 1989

[54] OBJECTIVE LENS FOR OPTICAL PICKUP

[75] Inventors: Masato Iwai, Miyagi; Ichiro Morishita, Iwanuma; Masaru Nakayama, Kakuda, all of Japan

[73] Assignee: Alps Electric Co., Ltd., Japan

[21] Appl. No.: 90,223

[22] Filed: Aug. 27, 1987

[30] Foreign Application Priority Data

Oct. 20, 1986 [JP] Japan ................. 61-250020

[51] Int. Cl.$^4$ .............................................. G02B 3/02
[52] U.S. Cl. .................................................. 350/432
[58] Field of Search ........................................ 350/432

[56] References Cited

U.S. PATENT DOCUMENTS 4,571,034 2/1986 Nakamura ........................... 350/432
4,657,352 4/1987 Suda et al. ........................... 350/432

Primary Examiner—John K. Corbin
Assistant Examiner—Rebecca D. Gass
Attorney, Agent, or Firm—Guy W. Shoup; Paul J. Winters

[57] ABSTRACT

An ojective lens for use in an optical pickup that is employed in a compact disk player, for example. The objective lens has a first aspherical surface on which parallel light rays impinge and a second spherical surface that faces the disk. The aspherical surface lies in a meridian plane of a cartesian coordinate system. The X-axis of this coordinate system is taken on the optical axis, the Y-axis is taken at the apex of the aspherical surface. The aspherical surface which is axially symmetrical is given by $$x = (y^2/r_1)/\{1 + \sqrt{1-(k+1)(y^2/r_1^2)}\} + d\,y^4 + e\,y^6 + f\,y^8 + g\,y^{10}$$

where $r_1$ is the radius of curvature of a reference inscribed sphere at the apex of the aspherical surface, k is a conic constant, d, g, f, and g are expansion coefficients of the fourth, sixth, eighth, and tenth orders, respectively. The lens satisfies the following three relations:
(1) $0.34 < (N/2) - \{(N^2-1)/N^2\}(r_1/F) < 0.38$
(2) $(1.1 \times N) - 2.55 < k < (0.5 \times N) - 1.35$
(3) $N \geq 1.7$.

where N is the index of refraction of the medium of the lens at the wavelength of the incident light, and F is the focal length.

1 Claim, 3 Drawing Sheets

OBJECTIVE LENS FOR OPTICAL PICKUP

FIELD OF THE INVENTION

The present invention relates to an objective lens which is used in the optical pickup of a compact disk player, for example, to converge a reading beam before it strikes an optical disk and, more particularly, to an objective lens which is molded out of glass, can be mass-produced, and exhibits quite small aberrations.

BACKGROUND OF THE INVENTION

An optical pickup for use in a compact disk player, for example, is equipped with an objective lens for focusing a laser beam onto the surface of an optical disk on which information is recorded. Since microscopic pits which are formed in the recording surface of an optical disk at a high density are required to be read, an objective lens of this kind needs a resolution of at least 1 micron and must focus a minute beam spot on the recording surface of the disk accurately. In order to read information correctly, the spherical aberration of the objective lens must be appropriately compensated for. Also, other various conditions are required to be met.

Heretofore, it has been necessary to use a plurality of ground lenses together to form an accurate lens system as mentioned above. The weight of the mirror cylinder increases according to the number of the lenses. Also, a larger load is imposed when the cylinder is moved for a compensating operation. Further, the working distance cannot be made sufficiently long because of the relation to the focal length of the whole lens system.

Recently, it has been proposed to use a single lens having aspherical surfaces formed by pressing on both sides as an objective lens. However, many of conventional pressed lenses are molded out of plastic materials as disclosed in Japanese Patent Laid-Open Nos. 201210/1982 and 76512/1982, for example. These plastic lenses are inferior in durability, resistance to heat, and resistance to chemicals, which arise from the fundamental properties of plastics.

On the other hand, lenses molded out of glass are much superior to plastic lenses in durability, resistance to heat, and resistance to chemicals. However, an aspherical surface is transferred to a glass lens with poor accuracy, because glass materials are treated at much higher temperatures than plastic materials. Also, the higher temperatures shorten the life of the die, as compared with cases of plastic lenses. Since many conventional lenses have aspherical surfaces on both sides, the cost of the die is increased. This greatly affects the cost to form lenses, because dies used to mold glass have a short life. Further, when an aspherical lens is fabricated in practice, the accuracy decreases to thereby produce wave aberration and other aberrations, although an aspherical lens almost free of aberrations can be designed. Especially, for lenses molded out of glass, this tendency is conspicuous for the following reason. When lenses are molded, only very close tolerances are permitted on important factors of lenses, such as axial gap of both surfaces, inclination of surface, and variations in the thickness at the center. When lenses are actually machined, the dimensions are not within the tolerances.

SUMMARY OF THE INVENTION

It is an object of the present invention to provide an objective lens which is molded out of glass and which can be mass-produced economically.

It is another object of the invention to provide an objective lens which can be molded with an inexpensive die in such a way that the shape of the die can be transferred to the lens accurately.

The present invention has been made in view of the fact that the aforementioned tolerances are greatly affected by the index of refraction of the material. Certain conditions are imposed on this index of refraction to make the tolerances as less close as possible. The cost of the die is reduced by making only one side of the lens aspherical. The diameter of the inscribed sphere on the aspherical surface is maximized so that the shape of the die may be transferred to the lens accurately. Thus, the lens can be mass-produced economically.

DETAILED DESCRIPTION OF THE INVENTION

Figure 1:
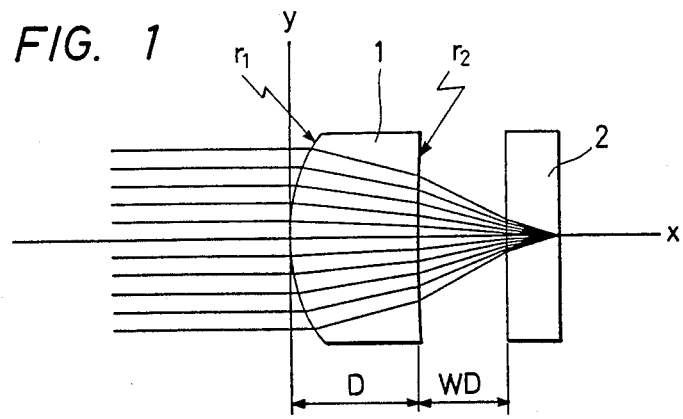
FIG. 1 is a front elevation of an objective lens according to the invention and an optical disk, the lens being used in an optical pickup.

An objective lens which embodies the concept of the invention and is used in an optical pickup has a first aspherical surface on which parallel light impinges and a second spherical surface that faces an optical disk. The aspherical surface lies in a meridian plane of a cartesian coordinate system. The X-axis of this coordinate system is taken on the optical axis, and the Y-axis is taken in a radial direction of the lens. The origin is taken at the apex of the aspherical surface. The aspherical surface which is axially symmetrical is given by $$x = (y^2/r_1)/\{1 + \sqrt{1-(k+1)(y^2/r_1^2)}\} + d\,y^4 + e\,y^6 + f\,y^8 + g\,y^{10}$$

where $r_1$ is the radius of curvature of a reference inscribed sphere which is measured at the apex of the aspherical surface, k is a conic constant, d is an expansion coefficient of the fourth order, e is an expansion coefficient of the sixth order, f is an expansion coefficient of the eighth order, and g is an expansion coefficient of the tenth order. This aspherical surface satisfies the following conditions:
(1) $0.34 < (N/2) - \{(N^2-1)/N^2\}(r_1/F) < 0.38$
(2) $(1.1 \times N) - 2.55 < k < (0.5 \times N) - 1.35$
(3) $N \geq 1.7$
where N is the index of refraction of the medium of the lens at the wavelength of the incident light, and F is the focal wavelength.

The first term of the equation expressing the aspherical surface of the objective lens represents the quadratic surface where the conic constant, or eccentricity, is equal to k. The second through fifth terms are added to compenstate for the spherical abberation.

The formula (1) is set to make appropriate the range of compensation made to the sine condition. For a lens whose one side is aspherical, the sine condition is determined by the radius of curvature $r_1$ of the inscribed sphere, the radius of curvature $r_2$ of the second spherical surface, the thickness of the lens D at the center, and the index of refraction N. As long as the spherical surface is concerned, only the spherical abberation is compensated for. The formula (1) sets the range of the amendments made to the sine condition, by means of the radius of curvature $r_1$ of the inscribed sphere on the first surface, the index of refraction N, and the focal length F. If the value of the formula (1) does not reach the lower limit, then the sine condition is not sufficiently compensated for. If the value of the formula (1) exceeds the upper limit, the sine condition is excessively compensated for.

The spherical aberration of the lens becomes apparent when the radius of curvature $r_1$ of the first surface, the radius of curvature $r_2$ of the second surface, the thickness of the lens D at the center, and the index of refraction N are determined. At the same time, it becomes clear into what kind of aspherical surface should one side be shaped to compensate for the produced spherical aberration. An ideal aspherical surface that can compensate for the shperical aberration is given by a formula having an infinite number of expansion terms. In practice, however, an aspherical surface is given by a formula having only a finite number of expansion terms. The aforementioned equation expressing the aspherical surface has expansion terms up to the tenth order. Therefore, it is possible to completely compensate for the spherical aberration, unlike the case of an ideal aspherical surface. For this reason, as shown in the formula (2), certain conditions are placed on the conic constant k included in the first term of the equation which represents the quadratic surface, in order to alleviate the burden imposed on the expansion terms of higher orders for compensating for the spherical aberration. If the value of the conic constant k included in the formula (2) is too large or too small, then the compensation made by the infinite number of expansion terms is insufficient. As a result, the spherical aberration is not completely compensated for.

The formula (3) is set to make less close the tolerances of the axial gap between the two sides and the inclination of the surfaces which are produced when the lens is shaped with a die, by imposing certain condition on the index of refraction N of the medium of the lens. This also increases the allowance of the light flux that impinges on the lens at a given angle to the optical axis.

Figure 4:
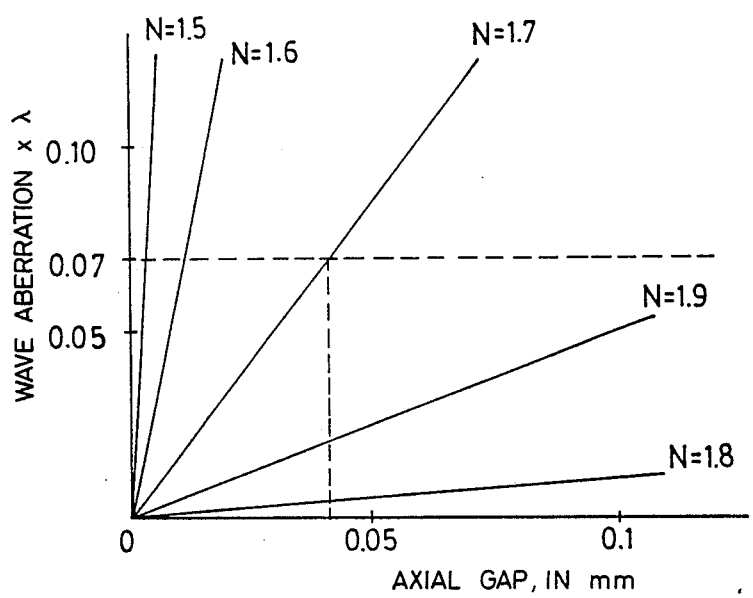

FIG. 4 is a graph showing the relation of wave aberration to the axial gap between the two surfaces of a lens, together with some different values of the index of refraction N. Lenses having a numerical aperture NA of 0.45 and a local length F of 4.45 are said to be suitable as objective lenses for an optical pickup. Simulations were made so that the index of refraction N of this lens might assume a value of 1.5 to 1.9. The relationship of wave aberration to the axial gap between the two surfaces of each lens were calculated, and the results are shown in the graph. In order to obtain a usable objective lens, it is necessary that the wave aberration be less than $0.07\lambda$, where $\lambda$ is the wavelength and equal to 0.78 $\mu$m, an dthat the axial gap between the two surfaces be in excess of about 0.04 mm. It can be seen from this graph that the index of refraction N is required to be in excess of 1.7.

Figure 5:
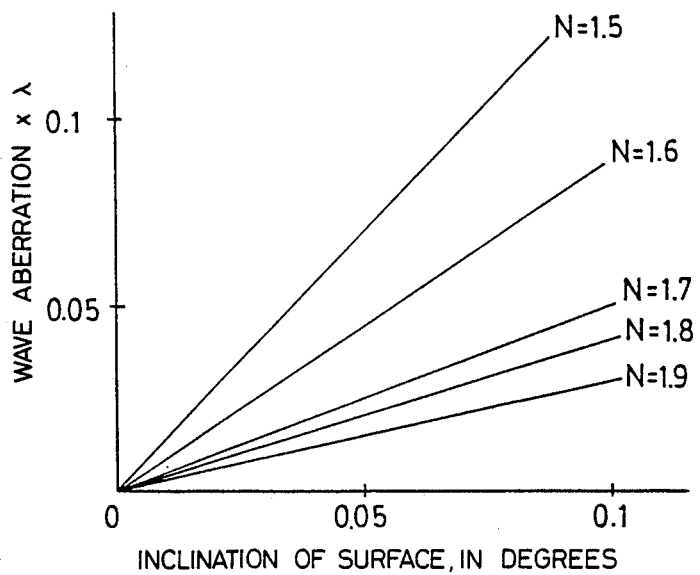

FIG. 5 shows the relation of wave aberration to the inclination of the second surface of each lens to the first surface. Simulations were made in the same manner as in the case already described in connection with FIG. 4. It can be understood from this graph that the wave aberration can be suppressed by setting the index of refraction N to values expressing 1.7, even if one surface is inclined to the other.

Figure 6:
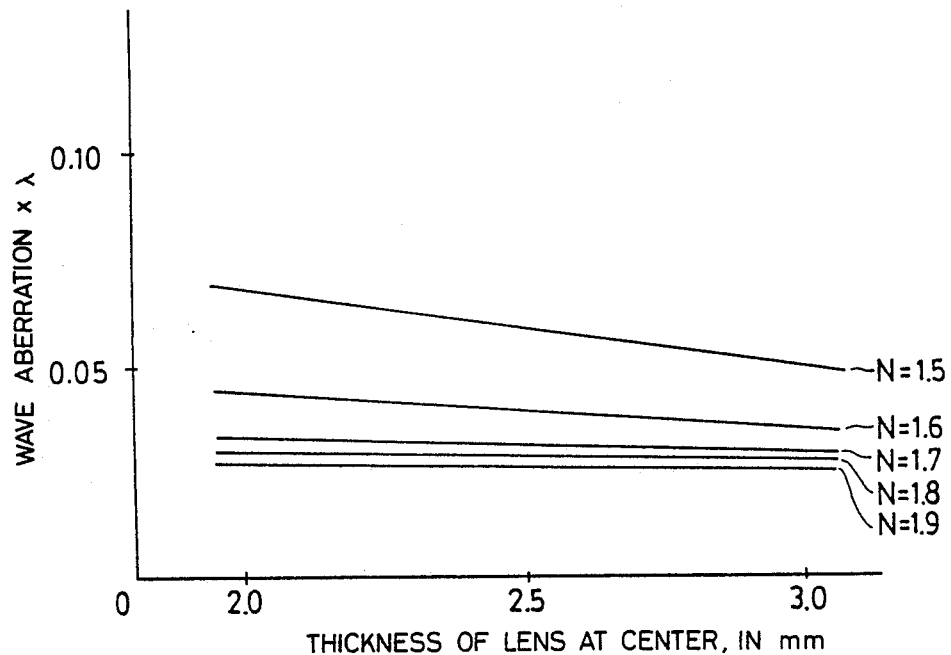
FIGS. 4–6 are graphs showing the results of simulations performed to satisfy the requirements of formula (3).

FIG. 6 shows the results of simulations performed to determine the relation of wave aberration to the index of refraction N when light flux which is parallel to a lens impinges on the lens at an angle to the optical axis. This angle was set to 1 degree, which is considered as a tolerance of the accuracy with which an optical pickup is assembled. It can also be seen from this graph that the wave aberration is small independent of the thickness of the lens at the center, if the index of refraction N is in excess of 1.7. In this way, by setting the index of refraction N to a value exceeding 1.7, the tolerances of the axial gap between the two surfaces of a lens and the inclination of one surface to the other can be made less close. Also, light rays which impinge at an angle of 1 degree are less affected. In the examples described below, $r_i$ is the radius of curvature of an inscribed sphere on the first aspherical surface, $r_2$ is the radius of curvature of the second spherical surface, D is the thickness of the lens measured at the center, F is the focal length, WD is the working distance. All of these dimensions are expressed in millimeters. N is the index of refraction at a wavelength of 0.78 $\mu$m.

EXAMPLE 1

| $r_1 = 3.59$, | | $r_2 = 25.17$ |
|---|---|---|
| D = 2.2, | | k = −0.433 |
| d = −1.4 × 10⁻⁵, | | e = −7.3 × 10⁻⁶ |
| f = −7.5 × 10⁻⁷, | | g = 0 |
| F = 4.45, | N = 1.9, | WD = 2.386 |

The value for satisfying the relations (1) is 0.367. The formula (2) is given by $-0.46 < k < -0.4$

EXAMPLE 2

| $r_1 = 3.65$, | | $r_2 = 28.05$ |
|---|---|---|
| D = 2.6, | | k = −0.426 |
| d = −4.3 × 10⁻⁵, | | e = −8.7 × 10⁻⁶ |
| f = −8.6 × 10⁻⁷, | | g = 0 |
| F = 4.45, | N = 1.9, | WD = 2.176 |

The value for satisfying the relations (1) is 0.358. The formula (2) is given by $-0.46 < k < -0.4$.

EXAMPLE 3

| $r_1 = 3.72$, | | $r_2 = 35.0$ |
|---|---|---|
| D = 2.9, | | k = −0.453 |
| d = −1.5 × 10⁻⁵, | | e = −6.0 × 10⁻⁶ |
| f = −1.0 × 10⁻⁶, | | g = 0 |
| F = 4.44, | N = 1.9, | WD = 2.030 |

The value for satisfying the relations (1) is 0.345. The formula (2) is given by $-0.46 < k < -0.4$.

EXAMPLE 4

| | |
|---|---|
| $r_1 = 3.75$, | $r_2 = 30.0$ |
| $D = 2.3$, | $k = -0.4568$ |
| $d = -9.4 \times 10^{-6}$, | $e = -3.1 \times 10^{-6}$ |
| $f = -9.3 \times 10^{-7}$, | $g = 0$ |
| $F = 4.58$, $N = 1.9$, | $WD = 2.480$ |

The value for satisfying the relations (1) is 0.359. The formula (2) is given by $-0.46 < k < -0.4$.

EXAMPLE 5

| | |
|---|---|
| $r_1 = 3.42$, | $r_2 = 64.36$ |
| $D = 2.0$, | $k = -0.4885$ |
| $d = -5.99 \times 10^{-5}$, | $e = -1.57 \times 10^{-5}$ |
| $f = -1.28 \times 10^{-6}$, | $g = -1.5 \times 10^{-8}$ |
| $F = 4.45$, $N = 1.8$, | $WD = 2.519$ |

The value for satisfying the relations (1) is 0.369. The formula (2) is given by $-0.57 < k < -0.45$

EXAMPLE 6

| | |
|---|---|
| $r_1 = 3.48$, | $r_2 = 107.39$ |
| $D = 2.4$, | $k = -0.496$ |
| $d = -5.9 \times 10^{-5}$, | $e = -1.6 \times 10^{-5}$ |
| $f = -1.33 \times 10^{-6}$, | $g = -1.2 \times 10^{-8}$ |
| $F = 4.45$, $N = 1.8$, | $WD = 2.312$ |

The value for satisfying the relations (1) is 0.359. The formula (2) is given by $-0.57 < k < -0.45$.

EXAMPLE 7

| | |
|---|---|
| $r_1 = 358$, | $r_2 = \infty$ |
| $D = 2.8$, | $k = -0.531$ |
| $d = -4.0 \times 10^{-6}$, | $e = -1.38 \times 10^{-5}$ |
| $f = -1.51 \times 10^{-6}$, | $g = 0$ |
| $F = 4.45$, $N = 1.8$, | $WD = 2.120$ |

The value for satisfying the relations (1) is 0.347. The formula (2) is given by $-0.57 < k < -0.45$.

EXAMPLE 8

| | |
|---|---|
| $r_1 = 3.24$, | $r_2 = -60.22$ |
| $D = 2.0$, | $k = -0.585$ |
| $d = -3.7 \times 10^{-5}$, | $e = -3.0 \times 10^{-5}$ |
| $f = -1.85 \times 10^{-6}$, | $g = -7.0 \times 10^{-8}$ |
| $F = 4.45$, $N = 1.7$, | $WD = 2.545$ |

The value for satisfying the relations (1) is 0.374. The formula (2) is given by $-0.68 < k < -0.5$.

EXAMPLE 9

| | |
|---|---|
| $r_1 = 3.32$, | $r_2 = -35.43$ |
| $D = 2.4$, | $k = -0.609$ |
| $d = -3.6 \times 10^{-5}$, | $e = -3.04 \times 10^{-5}$ |
| $f = -2.25 \times 10^{-6}$, | $g = -8.0 \times 10^{-8}$ |
| $F = 4.45$, $N = 1.7$, | $WD = 2.351$ |

The value for satisfying the relations (1) is 0.362. The formula (2) is given by $-.068 < k < -0.5$.

EXAMPLE 10

| | |
|---|---|
| $r_1 = 3.41$, | $r_2 = -23.83$ |
| $D = 2.8$, | $k = -0.6365$ |
| $d = -3.8 \times 10^{-5}$, | $e = -3.44 \times 10^{-5}$ |
| $f = -2.4 \times 10^{-6}$, | $g = -7.0 \times 10^{-8}$ |
| $F = 4.45$, $N = 1.7$, | $WD = 2.171$ |

The value for satisfying the relations (1) is 0.349. The formula (2) is given by $-0.68 < k < -0.5$.

Figure 2:
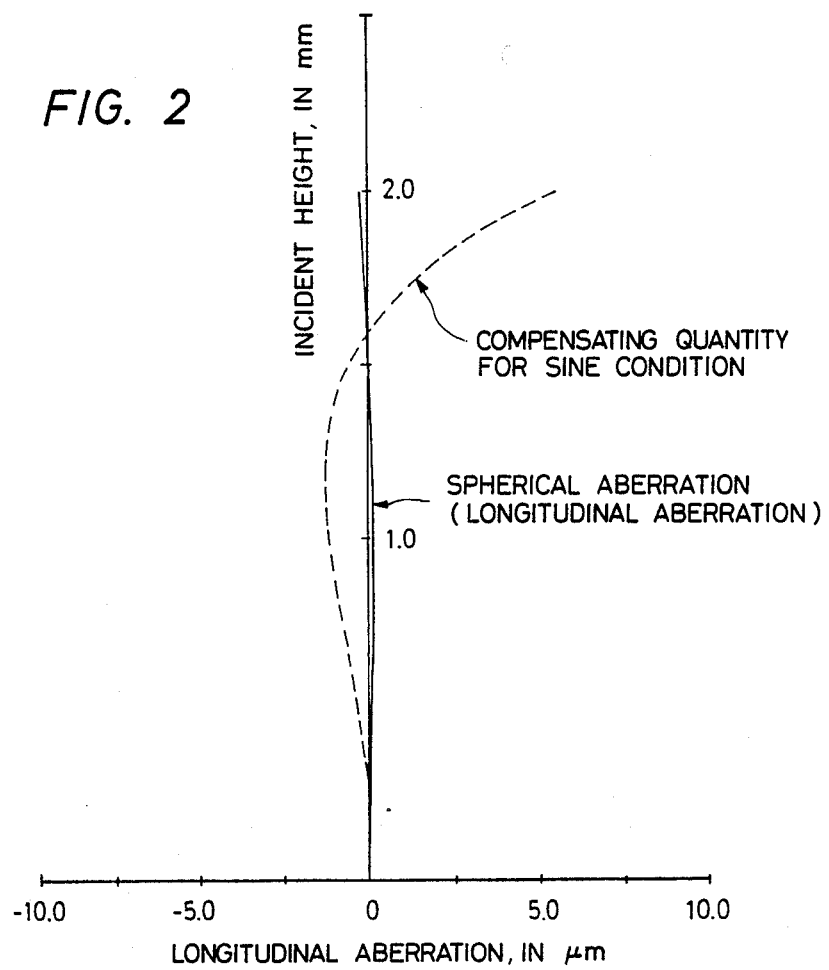
FIG. 2 is a graph in which compensating quantity for satisfying the sine condition is plotted against longitudinal aberration, for illustrating the principle of the invention.
Figure 3:
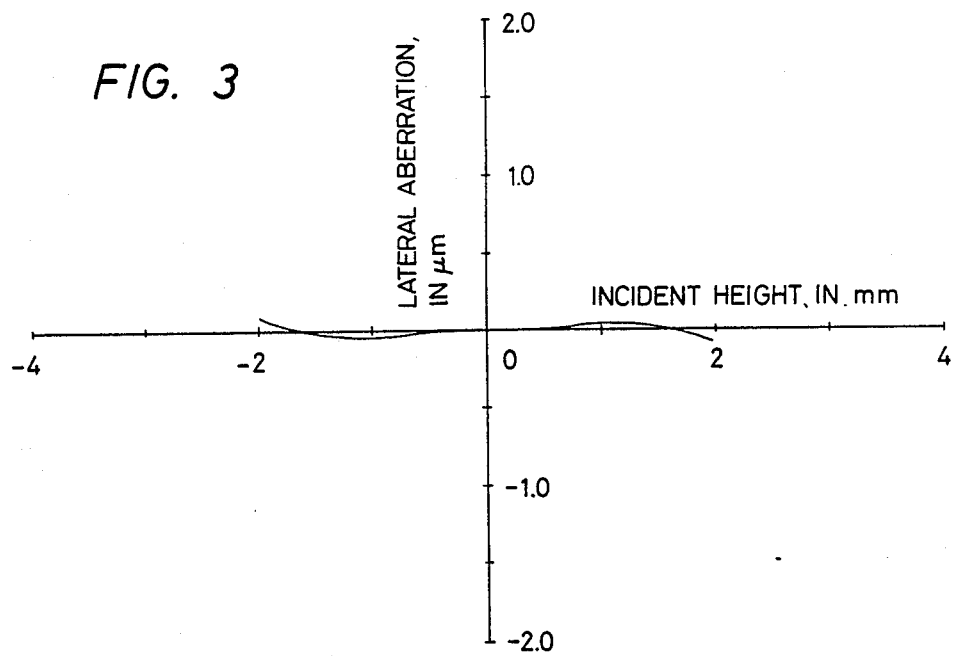
FIG. 3 is a graph showing the lateral aberration obtained under the same condition as in FIG. 2.

FIG. 2 shows the longitudinal aberration and the compensating quantity for the sine condition of Example 3. FIG. 3 shows the lateral aberration under this condition.

As described above, the novel objective lens yields the following advantages.

(1) Certain conditions are imposed on the index of refraction of the medium of the lens to make less close the tolerances of the axial gap between the two surfaces and the inclination of one surface to the other. Therefore, when the lens is molded out of glass, the molding tolerance is rendered less close. Hence, practicable lenses can be mass-produced.

(2) As shown in the above Examples, the radius of curvature $r_1$ of the inscribed sphere on the spherical surface can be made large. This improves the transfer of the shape of the die to the aspherical surface. Hence, a manufacturing step adapted for glass molds can be obtained.

(3) Since one side is an aspherical surface, the cost of the die can be reduced. When a lens is moloded out of glass, an elevated temperature is needed and so the life of the die is short. In spite of this, the total cost to fabricate the lens is curtailed.

What is claimed is:

1. An objective lens for an optical pickup, said lens having a first aspherical surface on which parallel light rays impinge and a second spherical surface that faces an optical disk, the first aspherical surface lying in a meridian plane of a cartesian coordinate system whose X-axis is taken on the optical axis, the Y-axis is taken in a radial direction of the lens, and the origin is taken at the apex of the aspherical surface, the first aspherical surface which is axially symmetrical being given by $$x = (y^2/r_1)/\{1 + \sqrt{1 - (k+1)(y^2/r_1^2)}\} + d\,y^4 + e\,y^6 + f\,y^8 + g\,y^{10}$$

where $r_1$ is the radius of curvature of a reference inscribed sphere at the apex of the aspherical surface, k is a conic constant, d is an expansion coefficient of the fourth order, e is an expansion coefficient of the sixth order, f is an expansion coefficient of the eighth order, and g is an expansion coefficient of the tenth order, the aspherical surface satisfying the following three conditions:

(1) $0.34 < (N/2) - \{(N^2 - 1)/N^2\}(r_1/F) < 0.38$
(2) $(1.1 \times N) - 2.55 < k < (0.5 \times N) - 1.35$
(3) $N \geq 1.7$ where N is the index of refraction of the medium of the lens at the wavelength of the incident light, and F is the focal length.

* * * * *